United States Patent [19]

Rhodes et al.

[11] 4,063,981

[45] Dec. 20, 1977

[54] METHOD OF MAKING A COMPOSITE SANDWICH LATTICE STRUCTURE

[75] Inventors: Marvin D. Rhodes, Yorktown; Martin M. Mikulas, Jr., Williamsburg, both of Va.

[73] Assignee: The United States of America as represented by the Administrator of the National Aeronautics and Space Administration, Washington, D.C.

[21] Appl. No.: 799,024

[22] Filed: May 20, 1977

Related U.S. Application Data

[62] Division of Ser. No. 723,264, Sept. 14, 1976.

[51] Int. Cl.$^2$ .................... B29C 11/00; B29C 27/30; B32B 3/12
[52] U.S. Cl. .................... 156/245; 156/285; 156/289; 428/116; 428/902
[58] Field of Search ............. 156/245, 228, 285, 289, 156/242; 273/73 F; 428/73, 116, 117, 118, 119, 120, 134, 138, 178, 593, 596

[56] References Cited

U.S. PATENT DOCUMENTS

| 3,201,138 | 8/1965 | Brown | 273/73 F |
| 3,770,560 | 11/1973 | Elder et al. | 273/73 F |
| 3,840,230 | 10/1974 | Schaefer et al. | 156/242 |
| 3,939,024 | 2/1976 | Hoggatt | 156/242 |

OTHER PUBLICATIONS

Popular Science, "Super-Strong Graphite," pp. 73-75, Apr. 1975.

*Primary Examiner*—Caleb Weston
*Attorney, Agent, or Firm*—Howard J. Osborn; Wallace J. Nelson; John R. Manning

[57] ABSTRACT

This invention relates to a lattice type structural panel utilizing the unidirectional character of filamentary epoxy impregnated composites to produce stiff lightweight structural panels for use in constructing large area panels for space satellites and the like.

2 Claims, 9 Drawing Figures

METHOD OF MAKING A COMPOSITE SANDWICH LATTICE STRUCTURE

This is a division of application Ser. No. 723,264, filed Sept. 14, 1976.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

Contemporary and future aerospace vehicle requirements continue to provide challenges to the structural designer for reducig structural weight. In the interst of fuel economy, a premium is placed on structural weight in the design aircraft. Similarly, the anticipated needs for very large area space structures will tax the load carrying capability of any conceivable booster system. Relative recent advances in filamentary composite materials have provided the structural design improvements of a factor of two to four in strength-to-density ratios and a factor of three to eight in modulus-to-density ratios when compared with the normally used metal structures. To fully exploit this potential, structural designs must be developed wherein the unidirectional nature of the advanced composite materials is considered from the outset.

Accordingly, it is an object of the present invention to provide a new and improved lightweight structural panel.

Another object of the present invention is the provision of a novel panel construction.

A further object of the present invention is the provision of a lattice type structural panel wherein the unidirectional characteristics of filamentary compositions are exploited.

An additional object of the present invention is the provisions of composite material panel structure wherein the geometry of the panel lattice network is tailored to provide the appropriate stiffness and loading requirements.

A further object of the present invention is a novel method of making a composite lattice panel structure.

BRIEF DESCRIPTION OF THE INVENTION

According to the present invention, the foregoing and other objects are attained by providing a lightweight honeycomb core sheet having a plurality of symmetrical angular openings extending through the core sheet to leave a lattice network or rows of honeycomb cells divided by the plurality of angular openings. Strips of prepreg composite tape of the exact width of the network are individually extended and this composite material temperature cured to bond the individual strips or tapes into a unitary panel structure with the honeycomb core. Where additional strength or stiffness of the panel is desired more than one ply or strip of tape may be bonded to one or more rows of the honeycomb cells. Also, the total mass of the lattice panel may be increased by varying the width of the structural rows of honeycomb cells making up the lattice network.

A more complete appreciation of the invention and many of the attendant advantages thereof will be readily apparent as the same becomes better understood by reference to the following detailed description when considered in connection with the accompanying drawings wherein.

Figure 1:
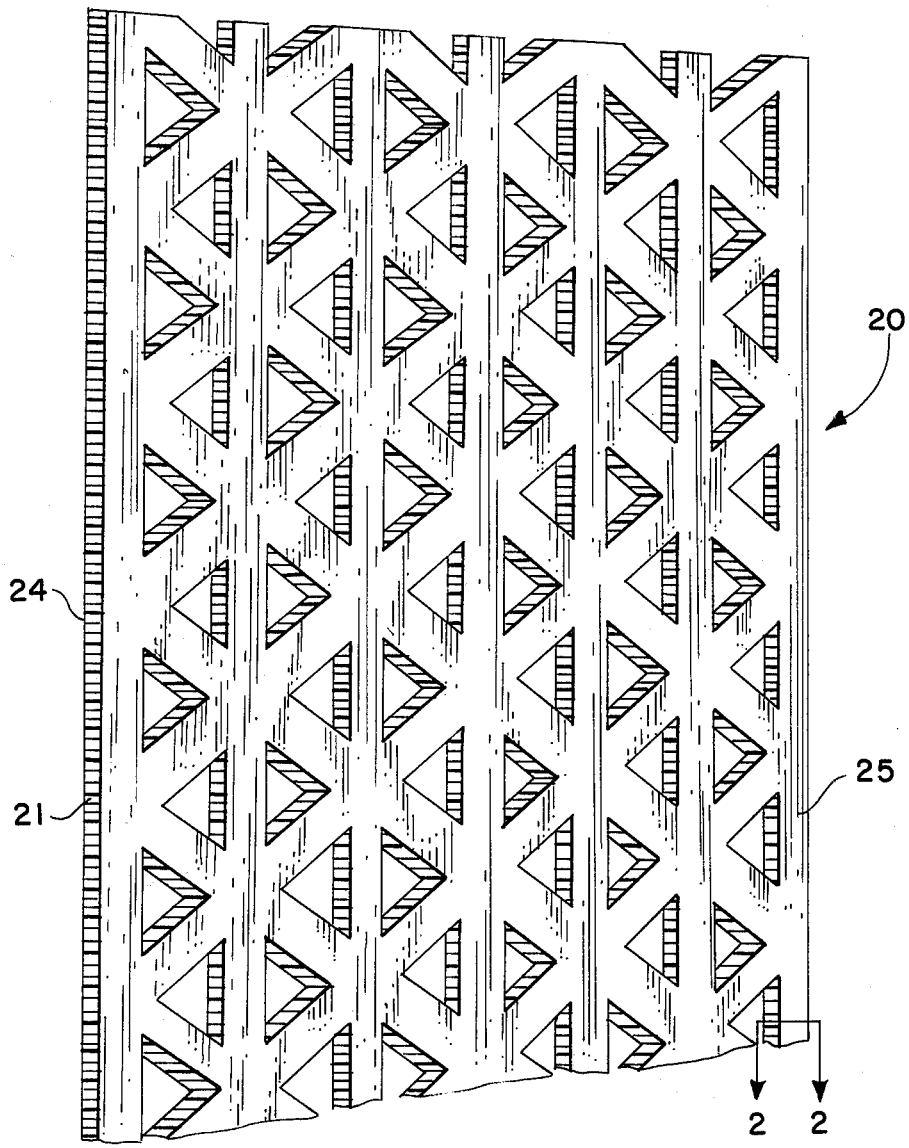
FIG. 1 is a perspective view of a lightweight sandwich lattice panel according to the present invention.

Referring now more particularly to the drawings and specifically to FIG. 1, there is shown one embodiment of the lightweight sandwich panel and designated by reference numeral 20. As shown there panel 20 is formed of a lattice network of honeycomb core cells as designated by reference numeral 21. The lattice is formed of rows of honeycomb cells extending transversely to inner and outer skin members as designated respectively by reference numerals 24 and 25 The lattice network of panel 20 is provided with 0° ± 60° angular facesheets.

Figure 2:
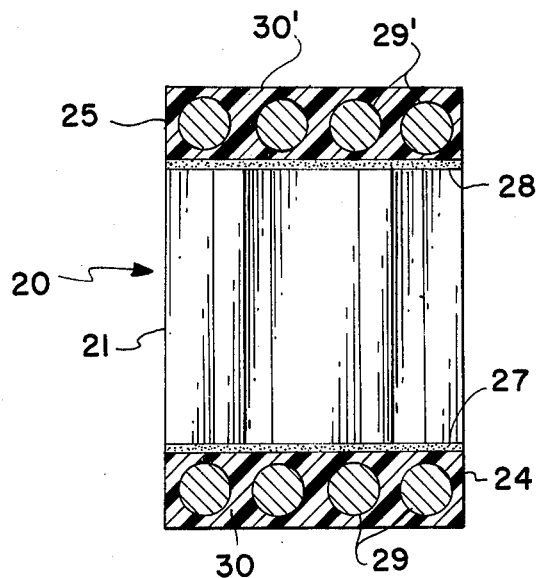
FIG. 2 is an enlarged sectional view taken along lines 2—2 of FIG. 1.

As shown more particularly in FIG. 2 each portion of the lattice network of panel 20 includes inner skin 24, outer skin 25, and intermediate core 21 adhesively bonded to the inner and outer skin respectively by adhesive layers, 27 and 28. Inner skin 24 and out skin 25 are of identical construction and provide a single skin for covering honeycomb core 21 and are formed of graphite/epoxy composite tapes. As shown in FIG. 2, skins 24 and 25, respectively, are made up of graphite fibers 29, 29' impregnated or embedded in a thermosetting epoxy matrix 30 and 30' as will be further explained hereinafter. These tapes are fabricated from undirectional preimpregnated tape that are cut into strips of the desired width and are available commercially, for example, from the Whittaker Corporation, Narmco Materials Division, 600 Victoria Street, Costa Mesa, Calif. 92627, under the tradename RIGIDITE 5208. This tradename material is a thermosetting epoxy resin curing at 355°±10° F for a period of 120 ± 5 minutes and employed as the matrix system with a variety of carbon fibers to produce RIGIDITE prepreg The term "prepreg" is a term of art that denotes preimpregnated fiber materials that may be temperature cured to provide a rigid composite structure. The impregnation of the carbon fibers is accomplished by a hot melt process that is free of solvents to provide outstanding handling characteristics, tack, long out time, and essentially void-free laminates. After impregnation with the epoxy, the resulting prepreg is cut into the desired width and rolled for storage under refrigeration in the temperature range of 0° or below and in a sealed container. The storage life of the prepreg at these temperatures is at least six months although the manufacturer only provides a warranty period of ninety days. If maintained at room temperature i.e., 70° ± 5° F. the storage life is approximately fourteen days. The graphite or carbon fibers utilized in making the prepreg are available in various diameters from numerous commercial sources, for example, Hercules, Morganite, Stackpole, Union Carbide and others. In the specific example described herein, the prepreg was RIGIDITE 5208-T-300 wherein the T-300 refers to Union Carbide's tradename Thornel 300 graphite fibers. These and all other graphite fibers contemplated in use of the present invention are continuous type fibers that extend the length of the prepreg tapes. Other prepreg tapes that are suitable in practice of the present invention are commercially available from the 3-M company, Hercules, Fiberite Company and others. Although the prepreg tapes are sold commercially in various widths, from slit widths as narrow as 0.376 inch to twelve inch widths, the most commonly used width is three inches. These widths may be cut when ready for use to that desired for the particular application. Also, the thickness of the prepreg tapes that are commercially available vary from those providing a cured ply thickness in the range of 0.0015 inch to 0.0025 inch for ultrathin applications to the standard range of 0.005 inch to .008 inch as employed in the specifically described application herein. The cured thickness is primarily dependent upon the graphite fiber diameter with the prepreg tapes having a fiber content of 58 ± 3% by volume and an epoxy content of 42 ± 3% and with a 60–40% graphite/epoxy being preferred. In one specific example the panel had a strip width of 0.25 inch and a lattice spacing of 1.5 inches.

The honeycomb core 21 for panel 20 in one specific embodiment was a high temperature nylon sold under the tradename NOMEX by the Hexcel Company. This specific material had hexagonal cells ⅛ inch in diameter and the sheet material had a density of three pounds per cubic foot. Other densities and cell shape and size are equally useful in practice of the construction of the panels of the present invention. In another specific example constructed, the honeycomb core 21 was constructed of American Cyanamid's aluminum core having 3/32 inch hexagonal cells and a density of 4 pounds per cubic foot.

The adhesive layers 27 and 28 are formed by a suitable epoxy resin adhesive, such for example, Epon Resin 828/ Epon Curing Agent V-40 manufactured by The Shell Chemical Company of Pittsburgh, Calif.

Figure 3:
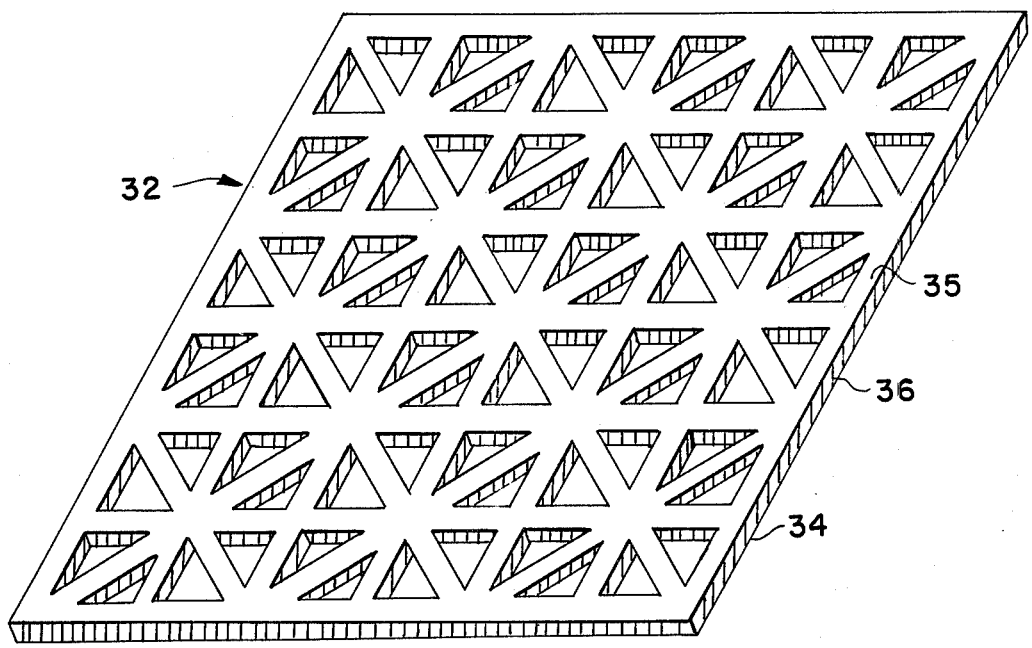
FIG. 3 is a perspective view of a panel similar to FIG. 1 and showing different angular network and face sheets for the panel.

Referring now to FIG. 3 lattice composite panel 32 is shown wherein the openings in the face sheets are 0° ± 45°, 90°. Otherwise the construction of panel 32 is identical with that described hereinabove for panel 20 and a single ply inner face skin 34 and single ply outer face skin 35 is bonded to honeycomb element 36.

Figure 4:
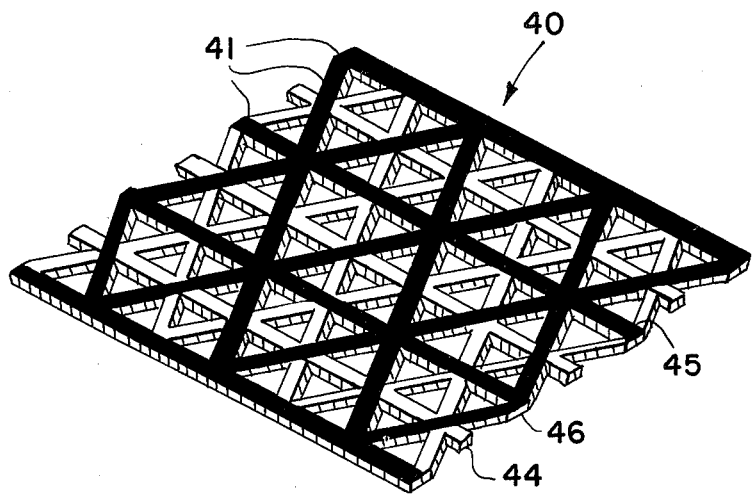
FIGS. 4-6 show various modifications of the panel of the present invention.

In FIG. 4 a panel configuration 40 is shown having multiple plies 41 for selected strips of outer skin 45 thereof. Honeycomb core 46 and inner skin 44 are of identical construction to the described hereinabove for the embodiments of FIGS. 1–3. Although only selected strips of the lattice network of panel 40 are shown as being provided with multiple skin plies, it is to be understood that in each of the embodiments of the invention described herein, the entire outer and inner skins or any number of the lattice strips thereof may be provided with multiple plies as so desired by increased panel stiffness and strength properties. As used herein, multiple plies is meant to include 2, 3, or 4 plies of prepreg tape.

Figure 5:
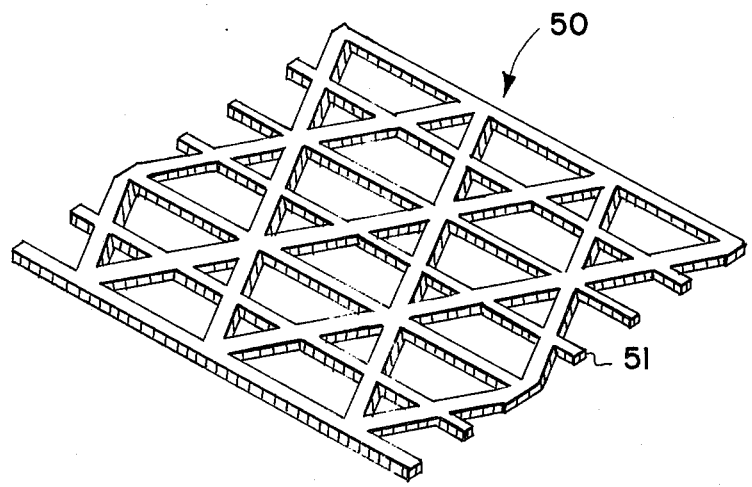

In FIG. 5 a composite lattice panel 50 is shown wherein selected diagonal strips or rows of the honeycomb cells in honeycomb core 51 are omitted. Structural panels of this type may be employed where the stiffness requirements are not as great as that required for the preceding embodiments, or where it is necessary to reduce the weight. Other embodiments that include additional strips and ply combinations will be readily apparent to those skilled in the art and are not included herein in the interest of clarity.

Figure 6:
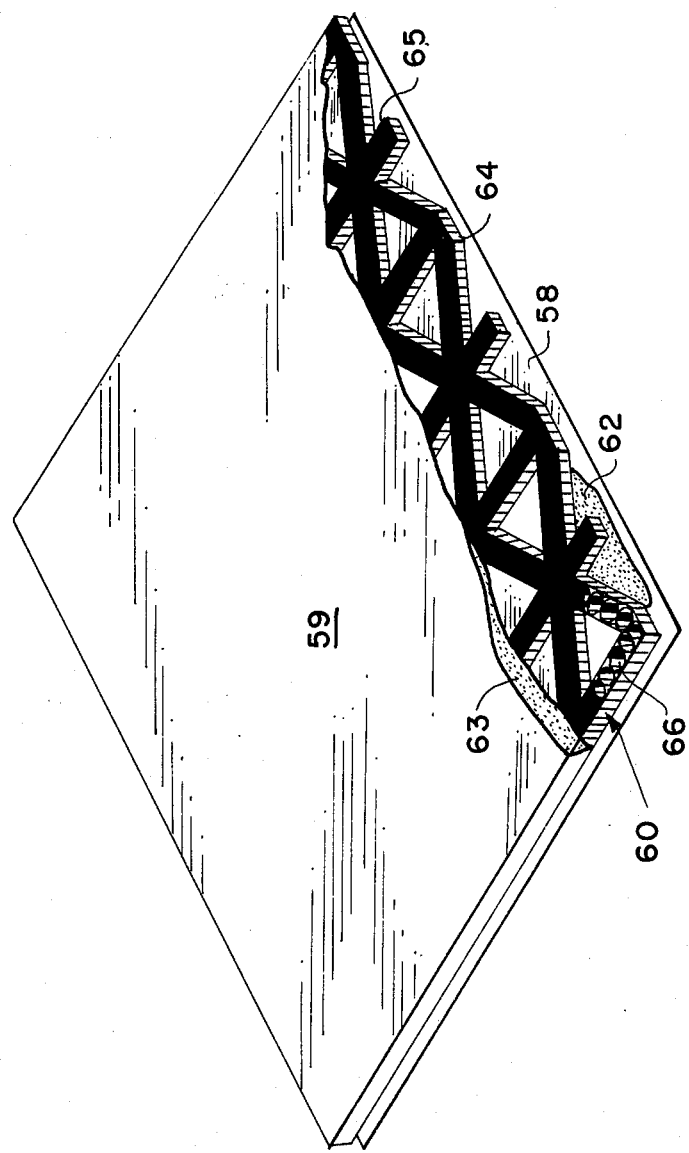

As shown in FIG. 6, as inner and outer face sheet of thin bonded plastic film, and designated respectively by reference numerals 58 and 59, may be bonded to lattice panel 60. Panels of this construction are desirable in some instances to support pressure or other distributed panel loads and the plastic film face sheets 58 and 59 are bonded, by respective layers 62 and 63 of a suitable adhesive to the respective inner and outer skins 64 and 65 covering the honeycomb core 66 of panel 60. Face sheets 58 and 59 are constructed of a suitable plastic such for example, DuPont's Mylar, a polyester film, or Kapton, a polyimide film.

Figure 7:
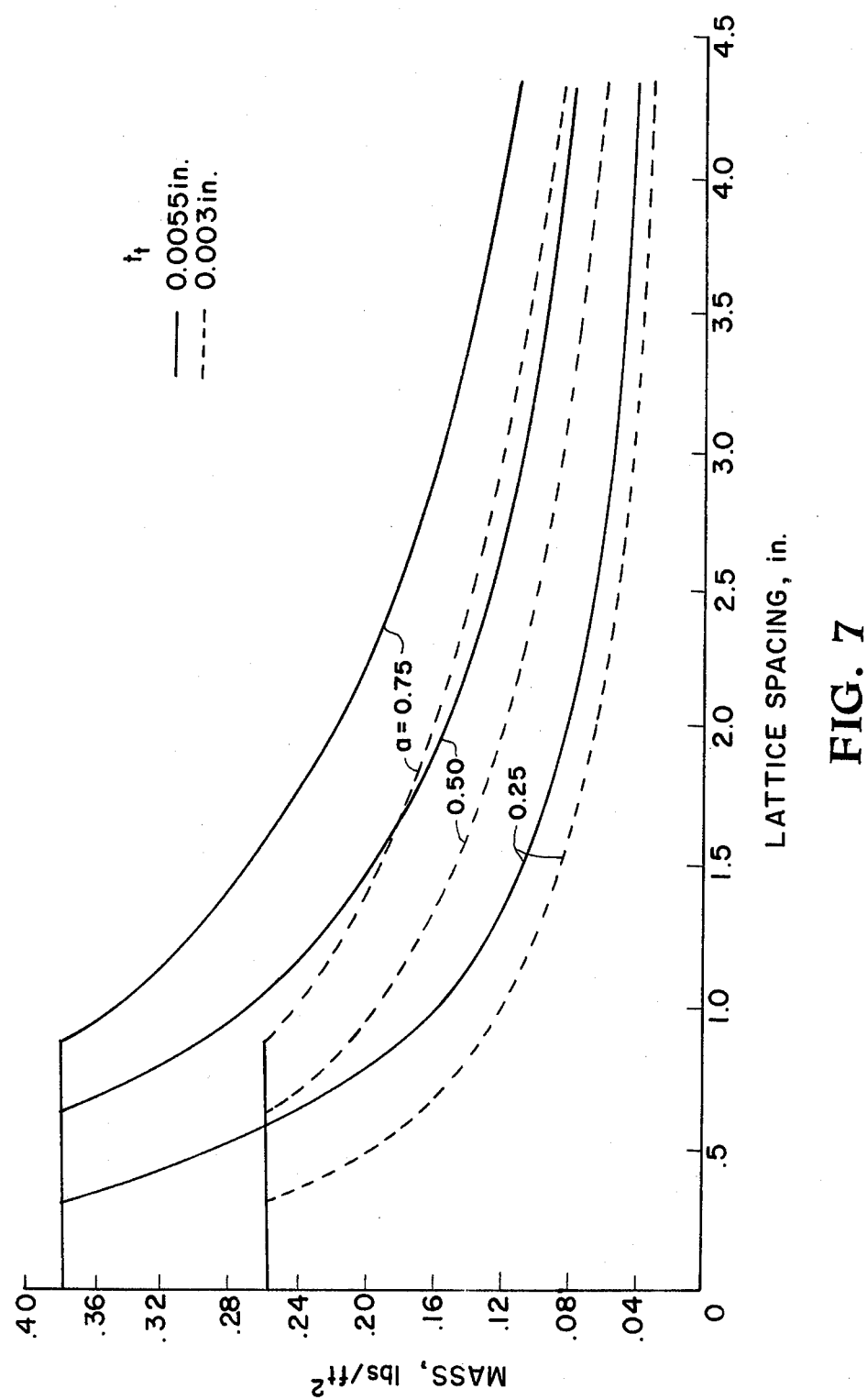
FIG. 7 is a graphic representation showing variations in mass relative to various lattice spacing in panels of the present invention.

FIG. 7 shows a graphic representation of the mass of several lattice panels constructed according to the present invention relative to the lattice network spacing. The solid lines represent prepreg tape thickness of 0.0055 inch while the dashed lines are for prepreg tapes of 0.003 inch.

Figure 8:
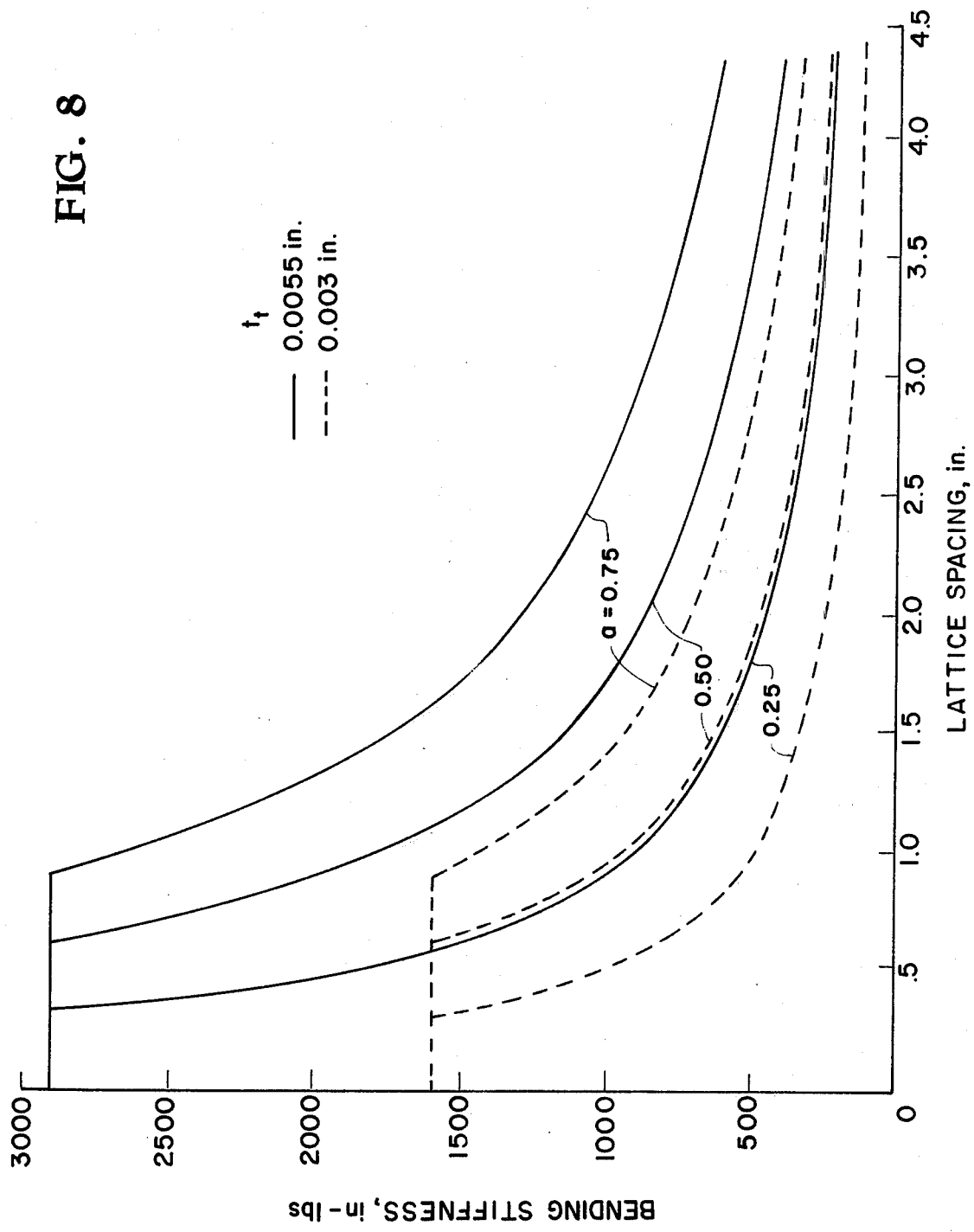
FIG. 8 is a graphic representation showing bending stiffness relative to the lattice spacing in panels according to the present invention.

FIG. 8 shows a graphic representative of plate bending stiffness for several lattice panels of the present invention relative to lattice network spacing and the solid and dashed lines are for tapes as described in FIG. 7.

Figure 9:
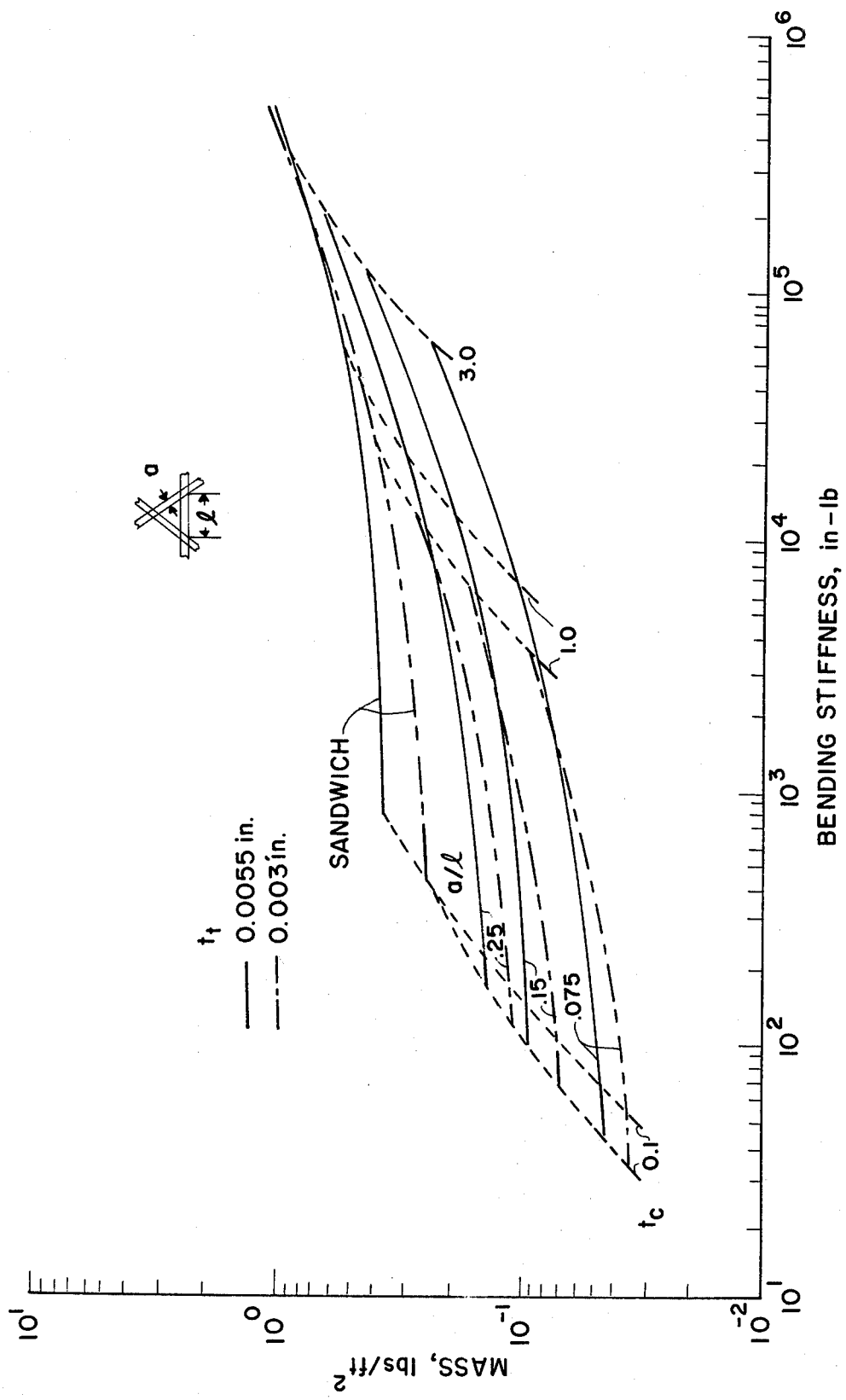
FIG. 9 is a graphic representation showing panel mass as a function of bending stiffness for panels according to the present invention.

FIG. 9 is a plot illustrating typical panel mass as a function of bending stiffness. Bending stiffness decreases as the lattice spacing increases as would be expected.

PANEL FABRICATION

In the preferred process for fabricating the panels of the present invention, the triangular patterns in the honeycomb core were removed before bonding of the inner and outer face skins. Although these triangular segments could be removed after bonding of the tape skin surfaces, this would require extreme care to avoid damage to the individual strips of tape as the core is being cut. A template and a cutter designed to remove the individual triangular sections were employed in fabricating the panels described herein. This template was made from aluminum stock and the grid pattern therein was cut on a numerical controlled milling machine. Silicon rubber blankets were also cut with the template and placed in the grooves provided in the base and top halves of an aluminum mold. These silicon rubber blankets permitted the overlapping tapes at the intersecting areas of the grid to be cushioned during pressure curing to avoid undue compression mold forces at the points. The mold grooves and silicon blankets were coated with a suitable conventional release agent, such for example, Frekote 33, a product of Frekote, Inc. of Boca Raton, Fla., or MS-122, a flurocarbon release agent containing tetrafluoroethylene polymer solids and manufactured by Miller Stephenson Chemical Company, Inc. The release agent serves to prevent sticking of the prepreg to the mold and silicon blankets. The composite material face sheets were then placed in the top and bottom halves of the mold. The grooves in the mold halves are cut slightly wider than that of the tapes to be employed to prevent binding of the cured panel after fabrication. Also the depth of the grooves are adequate to permit the use of multiple layers or plies of tapes with the silicon rubber blankets providing uniform forces to the tapes during bonding. After the tapes are positioned in the mold halves, the faces of the precut honeycomb are brush coated with a thin layer of an epoxy resin, such for example, Shell's Epon 828 Bonding Resin, and the honeycomb core positioned on one of the halves of the mold with the other half being then positioned over the honeycomb core to close the mold. Suitable lead weights were employed to load or weight the mold to assure good contact pressure between the face sheet tapes and the bonding resin. The weighted mold was then heated at approximately 200° F. for approximately 15 minutes to cure the bonding resin. This low temperature cure also permitted the resin matrix in the graphite to flow and give good joint compaction. The lattice was then removed from the mold, vacuum bagged and cured in an evacuated oven at a temperature of 355 ± 10° F for 120 ± 5 minutes to finally cure the resin in the graphite. This curing time and temperature is for Narmco's RIGIDITE 5208 prepreg system and may vary for other prepregs and according to the manufacturer's specifications. In the embodiments described herein it was necessary to cure the graphite prepreg outside of the aluminum mold due to the differential thermal expansion between the aluminum and the graphite composite. Molds machined from a material having low thermal expansion characteristics such as graphite or a ceramic material would permit complete bonding and curing of the lattice in the mold without any danger of damage to the mold or panel.

Although the specifically described examples and process described herein are concerned with graphite or carbon fiber prepreg systems, the invention is not so limited. For example, composite sandwich lattice panels have been constructed utilizing continuous filament boran fibers in an aluminum matrix and is available as Borsic Aluminum prepreg from Composite Materials Corporation, a subsidiary of Aluminum Corporation of America, Broad Brook, Connecticut. Also, Narmco Material Division of the Whittaker Corporation, Costa Mesa, California manufactures a KEVLAR 49 Aramid Fiber and Epoxy Resin prepreg system that is useful in making panels of the present invention. This system utilizes DuPont's continuous filament KEVLAR fibers in an epoxy matrix. As in the graphite systems, these prepregs are available in various widths, strengths and thicknesses and may be selected and cut to suit the needs of the panel constructed.

It is therefore to be understood that the forms of the inventior and the specific materials used in the specific examples shown and herein described are to be taken as preferred embodiments only, and that the invention may be practiced otherwise than as specifically described. For example, although various apparent modifications of the angular openings and the width of the lattice structural components have been illustrated, the invention is not so limited and changes in these and other features of the invention will be readily apparent to those skilled in the art in the light of the above teachings without departing from the spirit and scope of the appended claims.

What is new and desired to be secured by Letters Patent of the United States is:

1. A method of making a lightweight composite sandwich lattice structrual panel comprising:
    providing a mold formed of top and bottom halves each of which has an identical matching angular grid groove pattern formed in the surfaces thereof facing each other when the mold halves are assembled,
    coating the individual grooves in the matching grid patterns with a chemical release agent,
    providing silicon rubber blankets precut to match the grid pattern in each of the mold halves and positioning these blankets, one each, in the grid grooves of the mold halves,
    coating each silicon rubber blanket with a chemical release agent,
    positioning individual strips of prepreg tape over the silicon rubber blankets to form a tape surface in each groove of the grip patterns,
    providing a honeycomb core sheet having a plurality of honeycomb cells extending transversely therethrough with angular portions of the sheet being removed to provide a lattice network that will mesh with the grid grooves of the top and bottom mold halves,
    coating the honeycomb core sheet with a bonding adhesive and positioning the top and bottom mold halves to enclose the core sheet therebetween and in contact with the prepreg tape strips,
    applying pressure to and heating the closed mold at a temperature of approximately 200° F for approximately 15 minutes to bond the honeycomb core and prepreg tapes into a unitary structural panel,
    removing the unitary structural panel to a vacuum oven and heating the panel under vacuum at a temperature of 355° ± 10° F for a period of 120 ± 5 minutes to effect thermosetting cure of the resin in the prepreg tapes, and
    recovering a lightweight composite sandwich lattice structural panel from the oven.

2. The method of claim 1 wherein the prepreg tapes are continuous length graphite fibers embedded in an epoxy resin matrix.

* * * * *